United States Patent
Richardson et al.

(10) Patent No.: US 8,838,466 B2
(45) Date of Patent: Sep. 16, 2014

(54) SYSTEM AND METHOD TO TRACK THE STATUS, PHYSICAL LOCATION, AND LOGICAL LOCATION OF WORKFLOW OBJECTS IN A WORKFLOW CYCLE

(75) Inventors: John H. Richardson, Wilkes-Barre, PA (US); Carl J. Witkowski, Duryea, OR (US)

(73) Assignee: Guard Insurance Group, Wilkes-Barre, PA (US)

( * ) Notice: Subject to any disclaimer, the term of this patent is extended or adjusted under 35 U.S.C. 154(b) by 1507 days.

(21) Appl. No.: 11/164,731

(22) Filed: Dec. 2, 2005

(65) Prior Publication Data

US 2007/0130197 A1    Jun. 7, 2007

(51) Int. Cl.
| | |
|---|---|
| G06Q 10/00 | (2012.01) |
| G06Q 10/06 | (2012.01) |
| G06K 17/00 | (2006.01) |
| G06Q 10/10 | (2012.01) |
| G06F 12/08 | (2006.01) |

(52) U.S. Cl.
CPC .... G06Q 10/0633 (2013.01); *G06K 2017/0045* (2013.01); *G06Q 10/06* (2013.01); *G06Q 10/10* (2013.01); *G06F 12/0817* (2013.01)
USPC .......................................... 705/7.27; 705/7.11

(58) Field of Classification Search
CPC ................................................. G06Q 10/0633
See application file for complete search history.

(56) References Cited

U.S. PATENT DOCUMENTS

| | | | |
|---|---|---|---|
| 5,317,733 A | | 5/1994 | Murdock |
| 5,787,175 A | * | 7/1998 | Carter ........................... 713/165 |
| 6,112,242 A | * | 8/2000 | Jois et al. ....................... 709/225 |
| 6,317,848 B1 | | 11/2001 | Sorens et al. |
| 6,466,654 B1 | * | 10/2002 | Cooper et al. .............. 379/88.01 |
| 6,477,544 B1 | * | 11/2002 | Bolosky et al. ........................ 1/1 |
| 6,513,051 B1 | * | 1/2003 | Bolosky et al. ........................ 1/1 |
| 6,578,053 B1 | * | 6/2003 | Kidokoro et al. ...................... 1/1 |

(Continued)

FOREIGN PATENT DOCUMENTS

| | | |
|---|---|---|
| WO | WO 02/17032 | 2/2002 |
| WO | WO 02/079934 | 10/2002 |
| WO | WO 03/034299 | 4/2003 |

OTHER PUBLICATIONS

William J. Bolosky, Scott Corbin, David Goebel, and John R. Douceur (2000). Single Instance Storage in Windows 2000. Proceedings of the 4th USENIX Windows Systems Symposium. Aug. 3-4, 2000, Seattle, Washington, USA. pp. 13-24.*

*Primary Examiner* — Brett Feeney
(74) *Attorney, Agent, or Firm* — IP Authority, LLC; Ramraj Soundararajan

(57) ABSTRACT

An invention for tracking the status, physical location, and logical location of a workflow object as an object of a particular process is created and progresses logically through the phases of associated with the lifecycle. The workflow object remains, at all times, physically stored in an object repository. Each workflow object has at least one embedded new technology file system (NTFS) tag, wherein the NTFS tag is extended as the workflow object progresses through the phases of a workflow cycle. The embedded and extended NTFS tags define a state of the object progressing through said phases of said workflow cycle. Such embedded and extended NTFS tags can be extracted to obtain properties, methods, and events associated with a requested object, and a GUI displays the extracted information indicating status, physical location, and logical location of one or more workflow objects in a workflow cycle.

11 Claims, 3 Drawing Sheets

(56) References Cited

U.S. PATENT DOCUMENTS

| | | | |
|---|---|---|---|
| 6,597,783 B1 * | 7/2003 | Tada et al. | 379/265.09 |
| 6,860,422 B2 * | 3/2005 | Hull et al. | 235/376 |
| 6,948,135 B1 * | 9/2005 | Ruthfield et al. | 715/854 |
| 7,000,230 B1 * | 2/2006 | Murray et al. | 717/172 |
| 7,023,344 B2 * | 4/2006 | Schaper | 340/572.4 |
| 7,107,272 B1 * | 9/2006 | Milligan et al. | 1/1 |
| 7,127,470 B2 * | 10/2006 | Takeya | 707/805 |
| 7,155,667 B1 * | 12/2006 | Kotler et al. | 715/210 |
| 7,234,077 B2 * | 6/2007 | Curran et al. | 714/15 |
| 7,275,062 B2 * | 9/2007 | Deitz et al. | 1/1 |
| 7,281,018 B1 * | 10/2007 | Begun et al. | 1/1 |
| 7,310,644 B2 * | 12/2007 | Adya et al. | 1/1 |
| 7,328,225 B1 * | 2/2008 | Beloussov et al. | 1/1 |
| 7,357,300 B2 * | 4/2008 | Hull et al. | 235/376 |
| 7,369,681 B2 * | 5/2008 | Foth et al. | 382/103 |
| 7,386,794 B2 * | 6/2008 | Fujiwara | 715/704 |
| 7,392,522 B2 * | 6/2008 | Murray et al. | 717/174 |
| 7,490,109 B1 * | 2/2009 | Sikchi et al. | 1/1 |
| 7,506,250 B2 * | 3/2009 | Hull et al. | 358/1.16 |
| 7,512,896 B2 * | 3/2009 | Rockey et al. | 715/779 |
| 7,818,531 B2 * | 10/2010 | Barrall | 711/170 |
| 7,877,727 B2 * | 1/2011 | Sharp et al. | 717/106 |
| 2002/0077986 A1 * | 6/2002 | Kobata et al. | 705/52 |
| 2002/0143979 A1 * | 10/2002 | Douceur et al. | 709/231 |
| 2003/0193960 A1 | 10/2003 | Land | |
| 2004/0181294 A1 * | 9/2004 | Deitz et al. | 700/19 |
| 2004/0186750 A1 * | 9/2004 | Surbey et al. | 705/4 |
| 2004/0215552 A1 * | 10/2004 | Horn et al. | 705/38 |
| 2006/0168075 A1 * | 7/2006 | Kitada et al. | 709/206 |
| 2006/0209351 A1 * | 9/2006 | Saito | 358/3.28 |
| 2006/0265489 A1 * | 11/2006 | Moore | 709/223 |
| 2007/0061487 A1 * | 3/2007 | Moore et al. | 709/246 |

* cited by examiner

DocuTrack Document Tracking System- All Document Tracking Activity Since 11/15/2005

| System Generated Documents | | DocuT SImage Forms and Letters | |
|---|---|---|---|
| Code/Claim | Requesting User | Requested Date/Time | Document |
| COWC412923-002 | Alicia Noerr | 11/14/2005 08:06 AM | Free Text – One Page.pdf |
| COWC412923 | Alicia Noerr | 06/28/2005 11:27 AM | Field Rep – Mandatory & Advisory Recommendations.pdf |
| COWC412923 | Alicia Noerr | 06/28/2005 10:32 AM | Field Rep – Service Confirmation Letter Free Form – 1 page.pdf |

Close

Figure 1

View Requested Document Information

| Code/Claim | Requested Document Information |
|---|---|
| COWC412923 | Document Type: Field Rep – Service Confirmation Letter Free Form – 1 page.pdf<br>Requested By: Alicia Noerr<br>Requested Time: 06/28/2005 10:32 AM<br>Document was requested to perform the following:<br>    to Insured<br>    to Agent<br>    Send to DocuPDF to Other at andreaa@guard.com<br>    Store in DocuView: No |

[ Close ]   [ View Document ]

Figure 2

SYSTEM AND METHOD TO TRACK THE STATUS, PHYSICAL LOCATION, AND LOGICAL LOCATION OF WORKFLOW OBJECTS IN A WORKFLOW CYCLE

FIELD OF INVENTION

The present invention relates generally to the field of workflow processes. More specifically, the present invention is related to logical annotation and object tracking in a workflow process.

DISCUSSION OF PRIOR ART

An increasing number of industries choosing to become paperless have done so because of the numerous advantages associated with eliminating paper-based filing. Rather than adding to the climbing cost of file cabinets, office real estate, and human resources expended in manually processing paper-based systems, the trend has been to transition to a paperless system. A paperless workflow process not only obviates many of these issues, but it also provides many additional benefits. Along with the benefits associated with transitioning to a paperless workflow system, an exponentially increasing volume of document data flowing through a logical workflow requires significant considerations beyond those required of a paper-based system. It becomes necessary to provide a record of the processing path of the document, for functional and legal reasons.

It would be helpful for an administrator or manager to have immediate access to the number of how many documents are in a queue, the tasks already performed on a particular document, and those tasks that need to be assigned such that they are performed on the document at a later time.

Methods currently addressing this need include U.S. Pat. No. 6,578,053 to Kidokoro et al. which provides for a method of determining whether there is history associated with a particular document. The Kidokoro patent discloses document output processing comprised of transmitting a document by email or facsimile and printing a document. However, the Kidokoro method is limited in its applicability to all but print queue transmission history and physical location of paper documents.

U.S. Pat. No. 6,597,783 to Tada et al. provides for a method for tracking, routing, and storing information associated with a digital document. The digital document may originate from a digital scanner or a fax server. A contact record associated with a digital document is created to identify a routing designation on the disclosed digital document, and comprises fields of time and date in a digital document was received, the nature of the digital document, and pertinent phone numbers. However, no mention is made of tracking an object's logical position in a workflow process. Prior methods are limited by the fact that they are only able to provide for the physical location of a document in terms of physical transmission characteristics.

Whatever the precise merits, features, and advantages of the above cited references, none of them achieves or fulfills the purposes of the present invention.

SUMMARY OF THE INVENTION

Disclosed is a system and method for tracking the status, physical location, and logical location of a workflow object in a logical insurance lifecycle. As an object product of a particular insurance process is created, and progresses logically through the phases associated with the life of an insurance policy, the object remains, at all times, physically stored in an object repository. During each step of the insurance process, the object is annotated, modified, and updated within the object repository. Because the object is available for access at the object repository by a plurality of users, it becomes necessary to track the logical location of an object within a workflow process. At each stage in the insurance policy workflow, for example, issuing a policy, an owner will annotate an object with notes corresponding to the action performed. Based on these annotations, stored procedures within an object repository make it possible to ascertain which is currently performing an action upon an object and which user will be granted access to the object subsequently.

In addition to user annotations, upon entry into the paperless workflow database, each object is embedded with extended NTFS (New Technology File System) tags; objects are comprised of: documents, video, audio, or any other digital data object. These properties define where an object belongs within a physical storage hierarchy, and also define what state an object was last in. Embedded (e.g., author, title, etc.) and extended NTFS tags are used to determine properties, methods, and events associated with a particular object. Properties are comprised of destination process to which an object will eventually logically proceed to, rendering aspects for viewing an object, as well as generation aspects. Properties, for example, can be (but not limited to) recorded at creation of a file. Methods are comprised of queuing and batching and events are comprised of errors. Methods, for example, can be (but not limited to) fax, print, encode, or decode. Events, for example, can correspond to a file that was opened or data that was decoded.

The present invention allows a user accessing an object repository the ability to track the operations already performed on an object, the user performing those operations, where in the logical process flow an object might proceed subsequently, and any notes or errors that would cause an object to need manual processing. For example, an insurance policy object having embedded tags indicating that it has been assigned to a claims adjuster may not appear in the assigned adjuster's work queue. Checking other embedded tags for the insurance policy object will indicate that the object is indeed assigned to the claims adjuster, but has not yet rendered on the screen for the adjuster to see, or transactions which need to be completed before the adjustor can complete their task associated with the document. In the same manner, an object sent and received over a communications link is also monitored for signal strength (e.g., for a facsimile document), position in printer queue (e.g., for a document to be printed), and position in email server (e.g., for a document to be transmitted); whereby such properties, methods, and events are determined by accessing NTFS tags embedded into an object.

BRIEF DESCRIPTION OF THE DRAWINGS

FIG. 1 illustrates a GUI wherein each row corresponds to an object and displayed columns correspond to policy number or claim number for which the action was requested, name of the person or system requesting the action, current status of the action, date and time the action was requested, and the name of the object created by the action.

FIG. 2 is a Graphical User Interface (GUI) displaying information provided for a tracked object.

DESCRIPTION OF THE PREFERRED EMBODIMENTS

Figure 3:
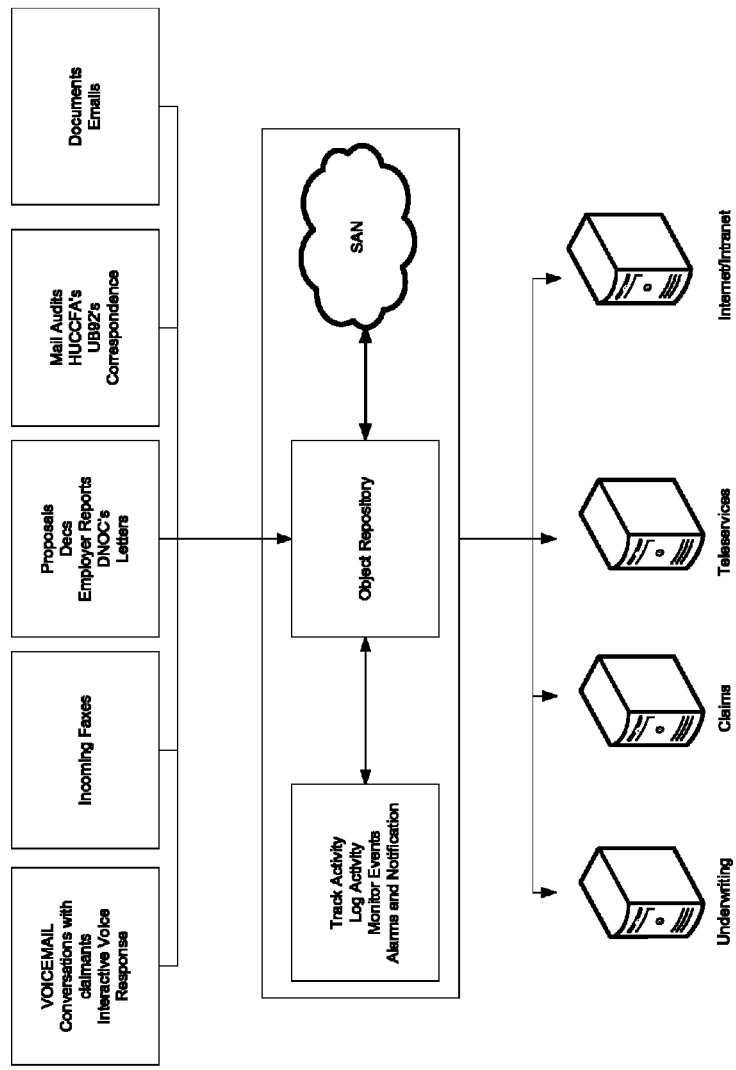
FIG. 3 illustrates a preferred embodiment of the present invention's system to track the status, physical location, and logical location of one or more workflow objects in a workflow cycle comprising a plurality of phases.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

In the present invention, a graphical user interface (GUI) provides a user with information as to the step in a logical insurance policy workflow process at which a requested object is currently active. Examples of user-tracked objects comprise: proposals, policies, endorsements, employer's reports, state forms, and direct bill statements. Each row of the GUI shown in FIG. 1 corresponds to an object and displayed columns correspond to policy number or claim number for which the action was requested, name of the person or system requesting the action, current status of the action, date and time the action was requested, and the name of the object created by the action. Thus, a user is able to determine whether a particular claim has been processed or a policy is currently being underwritten by tracking the status of an object associated with the particular claim or policy.

Tracked objects are divided into a plurality of categories; those objects that are system-generated and those objects generated through user annotations of objects residing in an object repository. NTFS tags associated with the requested object are obtained by the system and displayed as a part of the GUI.

Furthermore, the ability to track an electronic signal as it transmits an object to various physical locations is provided. Signal strength is tracked as an object is transmitted to any of: a printer, fax machine, email server, or computer monitor. A user double-clicks on a desired row and is subsequently provided with information shown in FIG. 2. Such information includes: object type, requesting user, the time at which the object was requested, time at which the request was accepted, physical storage location of document, signal strength of transmission, status of transmission, and object name.

The present invention provides for a method for tracking the status, physical location, and logical location of one or more workflow objects in a workflow cycle comprising a plurality of phases, wherein the method comprises: (a) embedding at least one new technology file system (NTFS) tag in each of the stored workflow objects; (b) extending the NTFS tag associated with an object progressing through the phases of the workflow cycle, wherein the embedded and extended NTFS tags define a state of the object progressing through the phases of the workflow cycle; (c) receiving a request for a state of an object; (d) obtaining the embedded and extended NTFS tags associated with the requested object; (e) extracting properties, methods, and events associated with the requested object from the obtained embedded and extended NTFS tags; (f) tracking said requested object via extracted properties, methods, and events; and, optionally, (g) displaying the extracted information in (e) via a GUI.

The present invention also provides for a system to track the status, physical location, and logical location of one or more workflow objects in a workflow cycle comprising a plurality of phases, wherein the system comprises: (a) an object repository storing one or more workflow objects, each workflow object having at least one embedded new technology file system (NTFS) tag, wherein the NTFS tag is extended as the workflow object progresses through the phases of the workflow cycle, wherein the embedded and extended NTFS tags define a state of the object progressing through the phases of the workflow cycle; (b) an interface to receive a request for a state of an object; (c) a tag extractor obtaining the embedded and extended NTFS tags associated with the requested object and extracting properties, methods, and events associated with the requested object from the obtained embedded and extended NTFS tags, wherein the extracted information is further processed to indicate status, physical location, and logical location of one or more workflow objects in a workflow cycle; and, optionally, (d) a GUI displaying the extracted information, wherein the displayed information indicates status, physical location, and logical location of one or more workflow objects in a workflow cycle.

FIG. 3 illustrates a preferred embodiment of the present invention's system to track the status, physical location, and logical location of one or more workflow objects in a workflow cycle comprising a plurality of phases. The object repository of FIG. 3 is operatively linked with a storage area network (SAN) and stores various data objects (such as, but not limited to, voicemail data, data related to conversations with claimants, interactive voice response data, incoming faxes, proposals, policy declarations, employer reports, DNOCs, letters, mail audits, HICCFAs, UB92s, correspondence data, documents, email, etc.). The present invention identifies embedded and extended NTFS tags associated with requested object and extracts properties, methods, and events associated with the requested object from the obtained embedded and extended NTFS tags, wherein the extracted information is further processed to indicate status, physical location, and logical location of one or more workflow objects in a workflow cycle.

Additionally, the present invention provides for an article of manufacture comprising computer readable program code contained within implementing one or more modules to track an object's physical and logical location in a workflow process. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Specifically, the present invention provides for an article of manufacture comprising computer readable program code contained within implementing one or more modules to: (a) embed at least one new technology file system (NTFS) tag in each of the stored workflow objects; (b) extend the NTFS tag associated with an object progressing through the phases of the workflow cycle, wherein the embedded and extended NTFS tags define a state of the object progressing through the phases of the workflow cycle; (c) aid in the reception of a request for a state of an object; (d) obtain the embedded and extended NTFS tags associated with the requested object; (e) extract properties, methods, and events associated with the requested object from the obtained embedded and extended NTFS tags; (f) tracking said requested object via extracted properties, methods, and events in (e), and, optionally, (g) aiding in the display of the tracked information via a GUI.

CONCLUSION

A system and method has been shown in the above embodiments for the effective implementation of a system and method to track the status, physical location, and logical location of workflow objects in a workflow cycle. While various embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by programming language, computing environment, or specific computing hardware.

What is claimed is:

1. A computer-based method when executed by a computer tracks a status, physical location, and logical location of one or more digital workflow objects in a workflow cycle, said workflow cycle comprising a plurality of phases, said one or more digital workflow objects stored in an object repository, said computer-based method comprising the following steps as executed by said computer:
   (a) identifying a digital workflow object of the one or more digital workflow objects in said object repository to be tracked;
   (b) identifying an existing embedded tag associated with said identified digital workflow object, said existing embedded tag storing properties defining where said identified digital workflow object belongs within a physical storage hierarchy of a file system;
   (c) extending said existing embedded tag via an extended tag where said extended tag does not store where said identified digital workflow object belongs within said physical storage hierarchy of said file system, but stores workflow properties, methods and events associated with said identified digital workflow object progressing through said plurality of phases of said workflow cycle;
   (d) receiving a request for a state of said identified digital workflow object in said object repository;
   (e) extracting said workflow properties, methods, and events associated with said identified digital workflow object; and
   (f) outputting said status, physical and logical location of said identified digital workflow object based on said extracted workflow properties, methods and events stored in said extended tag of said identified digital workflow object.

2. The computer-based method of claim 1, wherein said step of outputting comprises displaying said extracted workflow properties, methods and events stored in said extended tag of said identified digital workflow object.

3. The computer-based method of claim 1, wherein said workflow cycle is an insurance lifecycle.

4. The computer-based method of claim 1, wherein said identified digital workflow object is any of the following: a proposal, a policy, an endorsement, an employer's report, state form, direct bill statement, document, video object, audio object, a digital data object, or a record of who engaged a transaction.

5. The computer-based method of claim 1, wherein said extracted workflow properties comprises any of, or a combination of, the following: (1) properties identifying a destination process towards which said requested identified digital workflow object is logically progressing, (2) properties identifying rendering aspects for viewing said requested identified digital workflow object, or (3) properties identifying generation aspects for viewing said requested identified digital workflow object.

6. The computer-based method of claim 1, wherein said workflow methods comprise any of, or a combination of, the following: queuing or batching.

7. The computer-based method of claim 1, wherein said workflow events comprise errors.

8. The computer-based method of claim 1, wherein said existing embedded tags monitor any of the following: signal strength, position in printer queue, or position in email server.

9. The computer-based method of claim 1, wherein said existing embedded tags monitor signal strength associated with a facsimile document.

10. An article of manufacture comprising a non-transitory computer usable medium having computer readable program code embodied therein which, when executed by a computer, tracks a status, physical location, and logical location of one or more digital workflow objects in a workflow cycle, said workflow cycle comprising a plurality of phases, said one or more digital workflow objects stored in an object repository, said non-transitory computer usable medium comprising:
   (a) computer readable program code identifying a digital workflow object of said one or more digital workflow objects in said object repository to be tracked;
   (b) computer readable program code identifying an existing embedded tag associated with said identified digital workflow object, said existing embedded tag storing properties defining where said identified digital workflow object belongs within a physical storage hierarchy of a file system;
   (c) computer readable program code extending said existing embedded tag via an extended tag where said extended tag does not store where said identified digital workflow object belongs within said physical storage hierarchy of said file system, but stores workflow properties, methods and events associated with said identified digital workflow object progressing through said plurality of phases of said workflow cycle;
   (d) computer readable program code receiving a request for a state of said identified digital workflow object in said object repository;
   (e) computer readable program code extracting said workflow properties, methods, and events associated with said identified digital workflow object; and
   (f) computer readable program code outputting said status, physical and logical location of said identified digital workflow object based on said extracted workflow properties, methods and events stored in said extended tag of said identified digital workflow object.

11. A system to track a status, physical location, and logical location of one or more digital workflow objects in a workflow cycle, said one or more workflow cycle comprising a plurality of phases, said system comprising:
   a processor; and
   computer storage storing computer readable program code that when executed by said processor tracks a status, physical location, and logical location of one or more digital workflow objects in said one or more workflow cycle, said computer storage comprising:
   (a) computer readable program code identifying a digital workflow object of said one or more digital workflow objects in an object repository to be tracked;
   (b) computer readable program code identifying an existing embedded tag associated with said identified digital workflow object, said existing embedded tag storing properties defining where said identified digital workflow object belongs within a physical storage hierarchy of a file system;

(c) computer readable program code extending said existing embedded tag via an extended tag where said extended tag does not store where said identified digital workflow object belongs within said physical storage hierarchy of said file system, but stores workflow properties, methods and events associated with said identified digital workflow object progressing through said plurality of phases of said workflow cycle;

(d) computer readable program code receiving a request for a state of said identified digital workflow object in said object repository;

(e) computer readable program code extracting said workflow properties, methods, and events associated with said identified digital workflow object; and (f) computer readable program code outputting said status, physical and logical location of said identified digital workflow object based on said extracted workflow properties, methods and events stored in said extended tag of said identified digital workflow object.

* * * * *